US011700245B2

(12) United States Patent
Gan et al.

(10) Patent No.: US 11,700,245 B2
(45) Date of Patent: *Jul. 11, 2023

(54) KEY DISTRIBUTION METHOD, KEY RECEIVING METHOD, FIRST KEY MANAGEMENT SYSTEM, AND FIRST NETWORK ELEMENT

(71) Applicant: Huawei Technologies Co., Ltd., Shenzhen (CN)

(72) Inventors: Lu Gan, Shenzhen (CN); Bo Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/700,064

(22) Filed: Mar. 21, 2022

(65) Prior Publication Data

US 2022/0286442 A1 Sep. 8, 2022

Related U.S. Application Data

(63) Continuation of application No. 15/977,787, filed on May 11, 2018, now Pat. No. 11,303,622, which is a
(Continued)

(51) Int. Cl.
*H04L 29/06* (2006.01)
*G06F 21/00* (2013.01)
(Continued)

(52) U.S. Cl.
CPC .......... *H04L 63/061* (2013.01); *H04L 9/0844* (2013.01); *H04L 9/0869* (2013.01);
(Continued)

(58) Field of Classification Search
None
See application file for complete search history.

(56) References Cited

U.S. PATENT DOCUMENTS

| 2010/0111308 A1 | 5/2010 | Forsberg et al. |
| 2012/0204231 A1 | 8/2012 | Holtmanns et al. |

(Continued)

FOREIGN PATENT DOCUMENTS

| CN | 101656960 A | 2/2010 |
| CN | 102550001 A | 7/2012 |

(Continued)

OTHER PUBLICATIONS

3rd Generation Partnership Project; Technical Specification Group Services and System Aspects; 3G Security; Security architecture (Release 12), 3GPP TS 33.102 V12.2.0 (Dec. 2014), 76 pages.
3rd Generation Partnership Project; Technical Specification Group Services and System Aspects; 3G security; Network Domain Security (NDS); IP network layer security (Release 12), 3GPP TS 33.210 V12.2.0 (Dec. 2012), 24 pages.
(Continued)

*Primary Examiner* — Lisa C Lewis
(74) *Attorney, Agent, or Firm* — Slater Matsil, LLP

(57) ABSTRACT

The present invention disclose a key distribution method. The method includes obtaining, by a first key management system, a shared key of a first network element, where the shared key of the first network element is generated according to a key parameter obtained after the first network element performs authentication or a root key of the first network element; obtaining a service key, where the service key is used to perform encryption and/or integrity protection on communication data in a first service between the first network element and a second network element; performing encryption and/or integrity protection on the service key by using the shared key of the first network element, to generate a first security protection parameter; and sending the first security protection parameter to the first network element.

(Continued)

According to present invention, data can be protected against an eavesdropping attack in a sending process.

20 Claims, 8 Drawing Sheets

Related U.S. Application Data continuation of application No. PCT/CN2016/079291, filed on Apr. 14, 2016.

(51) Int. Cl.
| | |
|---|---|
| *H04L 9/40* | (2022.01) |
| *H04W 12/12* | (2021.01) |
| *H04W 12/02* | (2009.01) |
| *H04W 12/03* | (2021.01) |
| *H04W 12/041* | (2021.01) |
| *H04W 12/0431* | (2021.01) |
| *H04W 12/0433* | (2021.01) |
| *H04L 9/08* | (2006.01) |

(52) U.S. Cl.
CPC ...... *H04L 63/0457* (2013.01); *H04L 63/1475* (2013.01); *H04W 12/02* (2013.01); *H04W 12/03* (2021.01); *H04W 12/041* (2021.01); *H04W 12/0431* (2021.01); *H04W 12/0433* (2021.01); *H04W 12/12* (2013.01); *H04L 9/40* (2022.05); *H04L 2209/80* (2013.01)

(56) References Cited

U.S. PATENT DOCUMENTS

| | | | |
|---|---|---|---|
| 2014/0201532 A1 | | 7/2014 | Toy et al. |
| 2014/0230027 A1* | | 8/2014 | Cha ................. H04L 61/302 |
| | | | 726/5 |

FOREIGN PATENT DOCUMENTS

| | | |
|---|---|---|
| CN | 104683098 A | 6/2015 |
| CN | 104683304 A | 6/2015 |
| EP | 1973265 A1 | 9/2008 |
| WO | 2007042345 A1 | 4/2007 |
| WO | 2011043772 A1 | 4/2011 |
| WO | 2011143074 A1 | 11/2011 |

OTHER PUBLICATIONS

3rd Generation Partnership Project; Technical Specification Group Services and System Aspects; 3GPP System Architecture Evolution (SAE); Security architecture (Release 13), 3GPP TS 33.401 V13.0.0 (Sep. 2015), 131 pages.

* cited by examiner

KEY DISTRIBUTION METHOD, KEY RECEIVING METHOD, FIRST KEY MANAGEMENT SYSTEM, AND FIRST NETWORK ELEMENT

CROSS-REFERENCE TO RELATED APPLICATIONS

This application is a continuation of U.S. patent application Ser. No. 15/977,787, filed on May 11, 2018, which is a continuation of International Application No. PCT/CN2016/079291, filed on Apr. 14, 2016. The International Application claims priority to Chinese Patent Application No. 201510777207.4, filed on Nov. 13, 2015. All of the aforementioned patent applications are hereby incorporated by reference in their entireties.

TECHNICAL FIELD

The present invention relates to the field of mobile communications technologies, and in particular, to a key distribution method, a key receiving method, a first key management system, and a first network element.

BACKGROUND

In an existing mobile communication security architecture, security protection for data from a network element to the Internet is completed in a hop-by-hop form, that is, a segment encryption form. Moreover, in an existing 2G/3G/4G mobile architecture, a segment encryption manner is also used for end-to-end communication data. Segment encryption is relatively flexible, but because an intermediate node may obtain a plaintext of communication data, and the communication data cannot be protected against an eavesdropping attack, security of using the segment encryption manner is relatively poor.

For example, referring to FIG. 1, FIG. 1 is a schematic diagram of a protocol stack architecture of 4G LTE in the prior art. In FIG. 1, data sent by user equipment (UE) to a packet data network (PDN) gateway (GW) flows from the UE to an eNodeB and a serving gateway (serving GW) in sequence, and finally reaches the PDN GW. Encrypted protection is performed between the UE and the eNodeB by using a PDCP security protocol, and protection is performed both between the eNodeB and the serving GW and between the serving GW and the PDN GW by using an IPSec security protocol. Because the eNodeB is located outdoors, an attacker may break through the eNodeB and perform wiretapping to obtain plaintext content obtained after PDCP protocol decryption is performed.

SUMMARY

A first aspect of embodiments of the present invention provides a key distribution method, including: obtaining, by a first key management system, a shared key of a first network element, where the shared key of the first network element is generated according to a key parameter obtained after the first network element performs authentication or a root key of the first network element; obtaining, by the first key management system, a service key, where the service key is used to perform encryption and/or integrity protection on communication data in a first service between the first network element and a second network element; performing, by the first key management system, encryption and/or integrity protection on the service key by using the shared key of the first network element, to generate a first security protection parameter; and performing, by the first key management system, one of the following step A or step B: step A: sending the first security protection parameter to the first network element; or step B: sending the first security protection parameter to a second key management system, so that the second key management system sends the first security protection parameter to the first network element.

With reference to the first aspect, in a first possible implementation of the first aspect, the obtaining, by a first key management system, a shared key of a first network element includes: obtaining, by the first key management system, a first parameter by performing AKA authentication with the first network element, where the first parameter includes at least one of Kasme, an integrity key, or a cipher key; and calculating, by the first key management system, a dependent variable of a first preset key derivation function, where the shared key of the first network element includes the dependent variable of the first preset key derivation function, and an independent variable of the first preset key derivation function includes the first parameter.

With reference to the first aspect, in a second possible implementation of the first aspect, the obtaining, by a first key management system, a shared key of a first network element includes: receiving, by the first key management system, the shared key of the first network element sent by a mobility management entity MME, where the shared key of the first network element is calculated by the MME by using a third parameter; or receiving, by the first key management system, a third parameter sent by an MME; and calculating, by the first key management system, a dependent variable of a first preset key derivation function, where the shared key of the first network element includes the dependent variable of the first preset key derivation function, and an independent variable of the first preset key derivation function includes the third parameter, where the third parameter is obtained by the MME by performing AKA authentication with the first network element, and the third parameter includes at least one of Kasme, an integrity key, a cipher key, a non-access stratum integrity key, a non-access stratum cipher key, or a base station key.

With reference to the first aspect, in a third possible implementation of the first aspect, when the first key management system performs the step A, the obtaining, by the first key management system, a service key includes: selecting a random number, where the service key includes the random number; or obtaining a service parameter of the first service and at least one of a random number, Kasme of the first network element, an integrity key of the first network element, a cipher key of the first network element, the root key of the first network element, or the shared key of the first network element, and calculating a dependent variable of a second preset key derivation function, where the service key includes the dependent variable of the second preset key derivation function, and independent variables of the second preset key derivation function include a parameter of the first service, and include at least one of the random number, Kasme of the first network element, the root key of the first network element, or the shared key of the first network element.

With reference to the first aspect, in a fourth possible implementation of the first aspect, when the first key management system performs the step B, the obtaining, by the first key management system, a service key includes: selecting a random number, where the service key includes the random number; obtaining a service parameter of the first service and at least one of a random number, Kasme of the first network element, an integrity key of the first network element, a cipher key of the first network element, the root key of the first network element, or the shared key of the first network element, and calculating a first key according to the service parameter of the first service and at least one of the random number, Kasme of the first network element, the root key of the first network element, or the shared key of the first network element; receiving a second key sent by the second key management system, where the second key is obtained through calculation according to the service parameter of the first service and at least one of the random number, Kasme of the second network element, a root key of the second network element, or a shared key of the second network element; and calculating the service key according to the first key and the second key; or receiving the service key sent by the second key management system, where the service key is obtained through calculation by the second key management system according to a service parameter of the first service and at least one of a random number, Kasme of the second network element, an integrity key of the second network element, a cipher key of the second network element, a root key of the second network element, or a shared key of the second network element.

With reference to the first aspect, in a fifth possible implementation of the first aspect, before the obtaining, by the first key management system, a service key, the method further includes: receiving, by the first key management system, a key request from the first network element, the second network element, a gateway, or a server, where the key request is used to initiate generation of the service key, and the key request includes at least one of an identity of the first network element, an identity of the second network element, or a service parameter of the first service.

With reference to the first aspect, in a sixth possible implementation of the first aspect, when the first key management system performs the step A, a secure channel is established between the second network element and the first key management system; and the method further includes: sending the service key to the second network element by using the secure channel.

A second aspect of the embodiments of the present invention provides a key receiving method, including: obtaining, by a first network element, a shared key of the first network element, where the shared key of the first network element is generated according to a key parameter obtained after the first network element performs authentication or a root key of the first network element; receiving, by the first network element, a first security protection parameter sent by the first key management system, where the first security protection parameter is obtained after the first key management system performs encryption and/or integrity protection on a service key by using the shared key of the first network element; and decrypting, by the first network element, the first security protection parameter according to the shared key of the first network element, to obtain a service key, where the service key is used to perform encryption and/or integrity protection on communication data when the first network element communicates with a second network element.

With reference to the second aspect, in a first possible implementation of the second aspect, the obtaining, by a first network element, a shared key of the first network element includes the following step C and/or step D: step C: obtaining, by the first network element, the root key of the first network element, and calculating a dependent variable of a first preset key derivation function, where the shared key of the first network element includes the dependent variable of the first preset key derivation function, and an independent variable of the first preset key derivation function includes the root key of the first network element; and step D: obtaining, by the first network element, a first parameter by performing AKA authentication, where the first parameter includes at least one of Kasme, an integrity key, or a cipher key; and calculating, by the first network element, the dependent variable of the first preset key derivation function, where the shared key of the first network element includes the dependent variable of the first preset key derivation function, and the independent variable of the first preset key derivation function includes the first parameter.

With reference to the first possible implementation of the second aspect, in a second possible implementation of the second aspect, the method further includes: obtaining, by the first network element, an identity of the second network element and/or a service parameter of the first service, where the independent variable of the first preset key derivation function further includes the identity of the second network element and/or the service parameter of the first service.

With reference to the second aspect, in a third possible implementation of the second aspect, before the receiving, by the first network element, a first security protection parameter sent by the first key management system, the method further includes: sending, by the first network element, a key request to the first key management system, where the key request is used to initiate generation of the service key, and the key request includes at least one of an identity of the first network element, an identity of the second network element, or a service parameter of the first service.

With reference to the third possible implementation of the second aspect, in a fourth possible implementation of the second aspect, before the sending, by the first network element, a key request to the first key management system, the method further includes: sending, by the first network element, a service request to a service server, where the service server is configured to perform service management between the first network element and the second network element; and receiving, by the first network element, a response message sent by the service server, where the response message includes at least one of an indicator, an identifier of the first network element, an identifier of the second network element, or the service parameter of the first service, and the indicator is used to indicate that the first service is authorized successfully.

With reference to the third possible implementation of the second aspect, in a fifth possible implementation of the second aspect, before the sending, by the first network element, a key request to the first key management system, the method further includes: receiving, by the first network element, a service message sent by a service server, a gateway, an MME, or the second network element, where the service message includes at least one of the identity of the first network element, the identity of the second network element, or the service parameter of the first service.

A third aspect of the embodiments of the present invention provides a first key management system, including: a first obtaining module, configured to obtain a shared key of a first network element, where the shared key of the first network element is generated according to a key parameter obtained after the first network element performs authentication or a root key of the first network element; a second obtaining module, configured to obtain a service key, where the service key is used to perform encryption and/or integrity protection on communication data in a first service between the first network element and a second network element; a first generation module, configured to perform encryption and/or integrity protection on the service key by using the shared key of the first network element, to generate a first security protection parameter; and a first sending module, configured to perform one of the following step A or step B: step A: sending the first security protection parameter to the first network element; or step B: sending the first security protection parameter to a second key management system, so that the second key management system sends the first security protection parameter to the first network element.

With reference to the third aspect, in a first possible implementation of the third aspect, the first obtaining module is specifically configured to: obtain a first parameter by performing AKA authentication with the first network element, where the first parameter includes at least one of Kasme, an integrity key, or a cipher key; and calculate a dependent variable of a first preset key derivation function, where the shared key of the first network element includes the dependent variable of the first preset key derivation function, and an independent variable of the first preset key derivation function includes the first parameter.

With reference to the third aspect, in a second possible implementation of the third aspect, the first obtaining module is specifically configured to: receive the shared key of the first network element sent by a mobility management entity MME, where the shared key of the first network element is calculated by the MME by using a third parameter; or receive a third parameter sent by an MME, where the third parameter is obtained by the MME by performing AKA authentication with the first network element; and calculate a dependent variable of a first preset key derivation function, where the shared key of the first network element includes the dependent variable of the first preset key derivation function, and an independent variable of the first preset key derivation function includes the third parameter, where the third parameter is obtained by the MME by performing AKA authentication with the first network element, and the third parameter includes at least one of Kasme, an integrity key, a cipher key, a non-access stratum integrity key, a non-access stratum cipher key, or a base station key.

With reference to the third aspect, in a third possible implementation of the third aspect, when the first sending module is configured to perform the step A, the second obtaining module is specifically configured to: select a random number, where the service key includes the random number; or obtain a service parameter of the first service and at least one of a random number, Kasme of the first network element, an integrity key of the first network element, a cipher key of the first network element, the root key of the first network element, or the shared key of the first network element, and calculate a dependent variable of a second preset key derivation function, where the service key includes the dependent variable of the second preset key derivation function, and independent variables of the second preset key derivation function include a parameter of the first service, and include at least one of the random number, Kasme of the first network element, the root key of the first network element, or the shared key of the first network element.

With reference to the third aspect, in a fourth possible implementation of the third aspect, when the first sending module is configured to perform the step B, the second obtaining module is specifically configured to: select a random number, where the service key includes the random number; obtain a service parameter of the first service and at least one of a random number, Kasme of the first network element, an integrity key of the first network element, a cipher key of the first network element, the root key of the first network element, or the shared key of the first network element, and calculate a first key according to the service parameter of the first service and at least one of the random number, Kasme of the first network element, the root key of the first network element, or the shared key of the first network element; receive a second key sent by the second key management system, where the second key is obtained through calculation according to the service parameter of the first service and at least one of the random number, Kasme of the second network element, a root key of the second network element, or a shared key of the second network element; and calculate the service key according to the first key and the second key; or receive the service key sent by the second key management system, where the service key is obtained through calculation by the second key management system according to a service parameter of the first service and at least one of a random number, Kasme of the second network element, an integrity key of the second network element, a cipher key of the second network element, a root key of the second network element, or a shared key of the second network element.

With reference to the third aspect, in a fifth possible implementation of the third aspect, the first key management system further includes: a first receiving module, configured to: before the second obtaining module obtains the service key, receive a key request from the first network element, the second network element, a gateway, or a server, where the key request is used to initiate generation of the service key, and the key request includes at least one of an identity of the first network element, an identity of the second network element, or a service parameter of the first service.

With reference to the third aspect, in a sixth possible implementation of the third aspect, when the first sending module is configured to perform the step A, a secure channel is established between the second network element and the first key management system; and the first key management system further includes a second sending module, configured to send the service key to the second network element by using the secure channel.

A fourth aspect of the embodiments of the present invention provides a first network element, including: a first obtaining module, configured to obtain a shared key of the first network element, where the shared key of the first network element is generated according to a key parameter obtained after the first network element performs authentication or a root key of the first network element; a first receiving module, configured to receive a first security protection parameter sent by the first key management system, where the first security protection parameter is obtained after the first key management system performs encryption and/or integrity protection on a service key by using the shared key of the first network element; and a second obtaining module, configured to decrypt the first security protection parameter according to the shared key of the first network element, to obtain a service key, where the service key is used to perform encryption and/or integrity protection on communication data when the first network element communicates with a second network element.

With reference to the fourth aspect, in a first possible implementation of the fourth aspect, the first obtaining module is specifically configured to perform the following step C and/or step D: step C: obtaining the root key of the first network element, and calculating a dependent variable of a first preset key derivation function, where the shared key of the first network element includes the dependent variable of the first preset key derivation function, and an independent variable of the first preset key derivation function includes the root key of the first network element; and step D: obtaining a first parameter by performing AKA authentication, where the first parameter includes at least one of Kasme, an integrity key, or a cipher key; and calculating the dependent variable of the first preset key derivation function, where the shared key of the first network element includes the dependent variable of the first preset key derivation function, and the independent variable of the first preset key derivation function includes the first parameter.

With reference to the first possible implementation of the fourth aspect, in a second possible implementation of the fourth aspect, the first network element further includes: a third obtaining module, configured to obtain an identity of the second network element and/or a service parameter of the first service, where the independent variable of the first preset key derivation function further includes the identity of the second network element and/or the service parameter of the first service.

With reference to the fourth aspect, in a third possible implementation of the fourth aspect, the first network element further includes a first sending module, configured to: before the first receiving module receives the first security protection parameter sent by the first key management system, send a key request to the first key management system, where the key request is used to initiate generation of the service key, and the key request includes at least one of an identity of the first network element, an identity of the second network element, or a service parameter of the first service.

With reference to the third possible implementation of the fourth aspect, in a fourth possible implementation of the fourth aspect, the first network element further includes: a second sending module, configured to: before the first sending module sends the key request to the first key management system, send a service request to a service server, where the service server is configured to perform service management between the first network element and the second network element; and a second receiving module, configured to receive a response message sent by the service server, where the response message includes at least one of an indicator, an identifier of the first network element, an identifier of the second network element, or the service parameter of the first service, and the indicator is used to indicate that the first service is authorized successfully.

With reference to the third possible implementation of the fourth aspect, in a fifth possible implementation of the fourth aspect, the first network element further includes: a third receiving module, configured to: before the first sending module sends the key request to the first key management system, receive a service message sent by a service server, a gateway, an MME, or the second network element, where the service message includes at least one of the identity of the first network element, the identity of the second network element, or the service parameter of the first service.

It can be learned from the foregoing technical solutions that the embodiments of the present invention have the following advantages. In the present invention, the first key management system sends a service key used for communication between network elements to the network elements, so that when sending data to each other, the network elements may use the service key to protect the data, thereby protecting the data against an eavesdropping attack in the sending process. In addition, the first key management system further performs encryption and/or integrity protection on the service key by using the shared key of the first network element, then generates the first security protection parameter, and sends the first security protection parameter to the first network element. Because the first network element generates the shared key of the first network element by using a method the same as that used by the first key management system, the service key can be restored from the first security protection parameter, thereby ensuring security of the service key.

DETAILED DESCRIPTION OF ILLUSTRATIVE EMBODIMENTS

To make persons skilled in the art understand the technical solutions in the present invention better, the following clearly describes the technical solutions in the embodiments of the present invention with reference to the accompanying drawings in the embodiments of the present invention. Apparently, the described embodiments are merely some rather than all of the embodiments of the present invention. All other embodiments obtained by persons of ordinary skill in the art based on the embodiments of the present invention without creative efforts shall fall within the protection scope of the present invention.

In the specification, claims, and accompanying drawings of the present invention, the terms "first", "second", "third", "fourth", and so on are intended to distinguish between different objects but do not indicate a particular order. In addition, the terms "including", "including", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Figure 1:
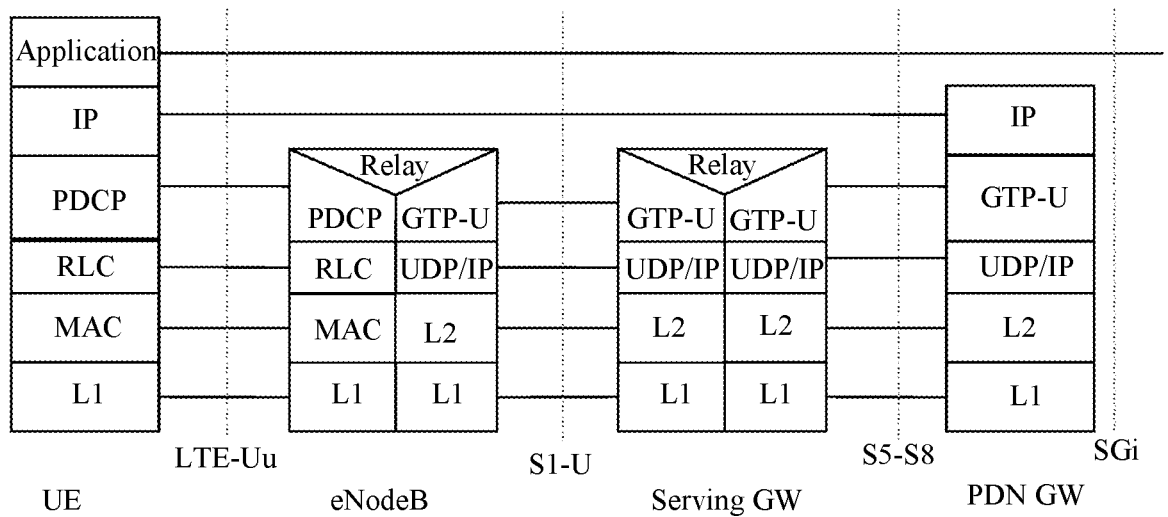
FIG. 1 is a schematic diagram of a protocol stack architecture of 4G LTE in the prior art.
Figure 2:
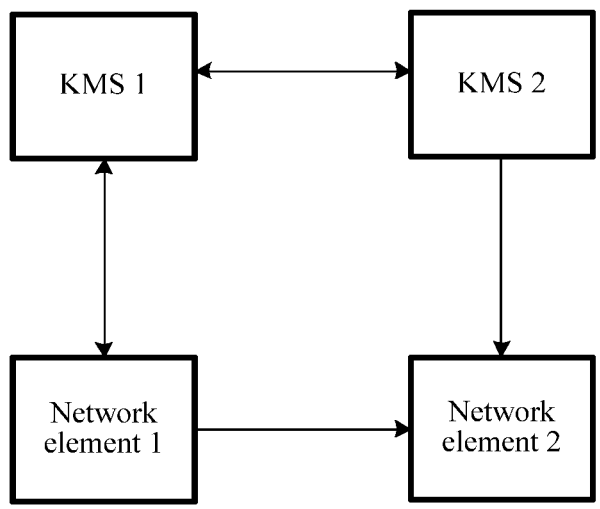
FIG. 2 is a schematic structural diagram of an embodiment of a communications system according to embodiments of the present invention.

For convenience of understanding the embodiments of the present invention, a communications system to be introduced into descriptions of the embodiments of the present invention is described first herein. As shown in FIG. 2, FIG. 2 is a schematic structural diagram of an embodiment of the communications system according to the embodiments of the present invention. The communications system includes a key management system (KMS) 1, a network element 1, a KMS 2, and a network element 2. The network element 1 and the network element 2 each may be any one of user equipment (UE), a base station, a server, a gateway, or a control network element, or another device that needs to perform encryption and/or integrity protection on data when sending the data. This is not limited herein. The KMS 1 and the KMS 2 may belong to a same operator or different operators, or be devices in the Internet. This is not limited herein.

In the present invention, when sending communication data to the network element 2, the network element 1 protects the communication data by using a service key or a key derived from the service key and then sends the communication data to the network element 2. The communication data is protected by performing encryption and/or integrity protection on the communication data by using the service key or the key derived from the service key. The network element 2 restores the received communication data according to the service key or the key derived from the service key. Therefore, before the network element 1 sends the communication data, the network element 1 and the network element 2 need to separately obtain the service key.

Figure 3:
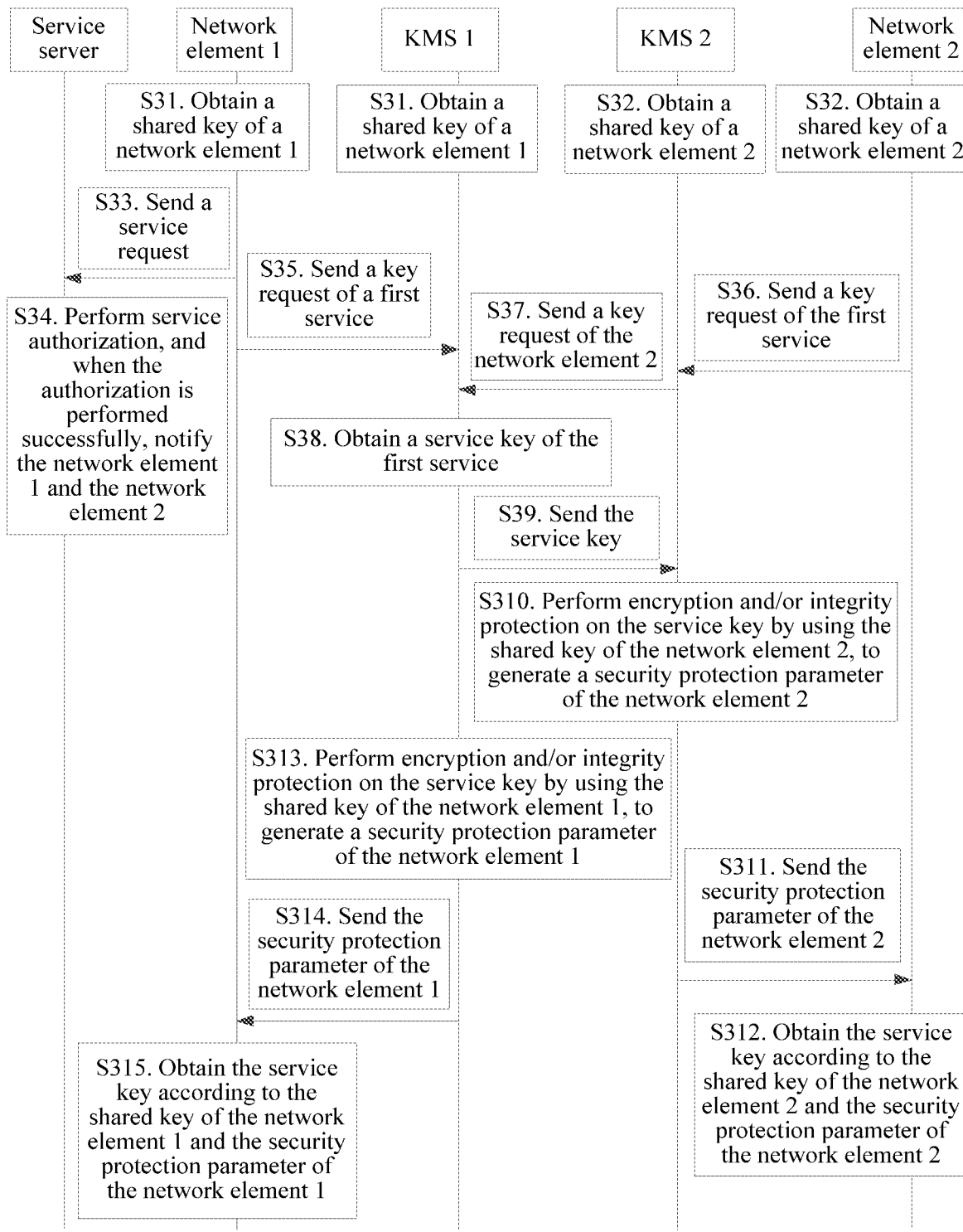
FIG. 3 is a schematic flowchart of an embodiment of a key distribution process of the communications system shown in FIG. 2.

Referring to FIG. 3, FIG. 3 is a schematic flowchart of an embodiment of a key distribution process of the communications system shown in FIG. 2. As shown in FIG. 3, the key distribution process in this embodiment includes the following steps.

S31: The network element 1 and the KMS 1 separately obtain a same shared key of the network element 1, where the shared key of the network element 1 is generated according to a key parameter obtained after the network element 1 performs authentication or a root key of the network element 1.

There are a plurality of methods for separately obtaining, by the network element 1 and the KMS 1, the same shared key of the network element 1, and several of the methods are described below by using examples.

Example 1: After the network element 1 and the KMS 1 perform AKA authentication, the network element 1 and the KMS 1 separately obtain Kasme, an integrity key (IK), and a cipher key (CK). An AKA authentication process is the prior art, and details are not described herein again. For convenience of description below, a definition of "a parameter 1" is introduced, and the parameter 1 includes at least one of Kasme, an IK, or a CK. After separately obtaining the parameter 1, the network element 1 and the KMS 1 calculate the shared key of the network element 1 according to the parameter 1 by using a same preset method.

Example 2: After the network element 1 and a mobility management entity (MME) perform AKA authentication, the network element 1 and the MME separately obtain Kasme, an IK, and a CK. After separately obtaining the parameter 1, the network element 1 and the MME calculate the shared key of the network element 1 according to the parameter 1 by using a same preset method. The MME sends the shared key of the network element 1 to the KMS 1.

Example 3: After the network element 1 and an MME perform AKA authentication, the network element 1 and the MME separately obtain Kasme, an IK, and a CK. The network element 1 and the MME separately determine a same parameter 3, and the parameter 3 includes at least one of Kasme, an IK, a CK, a non-access stratum integrity key KNASint, a non-access stratum cipher key KNASenc, or a base station key KeNB. The non-access stratum integrity key KNASint is obtained through calculation by using Kasme and a NAS integrity protection algorithm, and the non-access stratum cipher key KNASenc is obtained through calculation by using Kasme and a NAS encryption algorithm. The network element 1 and the MME calculate the shared key of the network element 1 according to the parameter 3 by using a same preset method. The MME sends the shared key of the network element 1 to the KMS 1. Alternatively, the KMS 1 is the MME. In this case, the step of "sending, by the MME, the shared key of the network element 1 to the KMS1" may be omitted.

Example 4: After the network element 1 and an MME perform AKA authentication, the network element 1 and the MME separately obtain Kasme, an IK, and a CK. The network element 1 and the MME separately determine a parameter 3, and the parameter 3 includes at least one of Kasme, an IK, a CK, a non-access stratum integrity key KNASint, a non-access stratum cipher key KNASenc, or a base station key KeNB. The non-access stratum integrity key KNASint is obtained through calculation by using Kasme and a NAS integrity protection algorithm, and the non-access stratum cipher key KNASenc is obtained through calculation by using Kasme and a NAS encryption algorithm. The MME sends the parameter 3 to the KMS 1, and the network element 1 and the KMS 1 calculate the shared key of the network element 1 according to the parameter 3 by using a same preset method.

Example 5: After the network element 1 and the KMS 1/an MME perform AKA authentication, the network element 1 and a home subscriber server (HSS) separately obtain Kasme, an IK, a CK, and the root key of the network element 1. For convenience of description below, a definition of "a parameter 2" is introduced, and the parameter 2 includes at least one of Kasme, an IK, a CK, or the root key of the network element 1. After separately obtaining the parameter 2, the network element 1 and the HSS calculate the shared key of the network element 1 according to the parameter 2 by using a same preset method. Further, optionally, the network element 1 and the HSS further obtain a service parameter in a service of the network element 1, and calculate the shared key of the network element 1 according to the parameter 2 and the service parameter by using a same preset method. After calculating the shared key of the network element 1, the HSS sends the shared key of the network element 1 to the KMS 1. There are a plurality of methods for obtaining, by the HSS, the service parameter of the service of the network element 1. For example, the service parameter may be sent by the KMS 1 to the HSS.

Example 6: After the network element 1 and the KMS 1/an MME perform AKA authentication, the network element 1 and the HSS separately obtain Kasme, an IK, a CK, and the root key of the network element 1 (that is, the parameter 2). After obtaining the parameter 2, the HSS sends the parameter 2 to the KMS 1. The network element 1 and the KMS 1 separately calculate the shared key of the network element 1 according to the parameter 2 by using a same preset method.

Example 7: A digital certificate or a same key Kx is preset for the network element 1 and the KMS 1 separately. The network element 1 and the KMS 1 may complete mutual authentication in a TLS, IPSec, or message authentication code-based authentication manner, and separately obtain a session key Ky between the network element 1 and the KMS 1 after the authentication. Alternatively, the network element 1 and the KMS 1 directly use the key Kx as a session key Ky between the network element 1 and the KMS 1. For convenience of description below, a definition of "a parameter 4" is introduced, and the parameter 4 includes the session key Ky between the network element 1 and the KMS1 after the authentication. After separately obtaining the parameter 4, the network element 1 and the KMS 1 calculate a service root key of the network element 1 according to the parameter 4 by using a same preset method.

In the foregoing five examples, there are a plurality of preset methods for calculating the shared key of the network element 1. For example, a dependent variable of a first preset key derivation function may be calculated. In the examples 1 and 2, an independent variable of the first preset key derivation function includes the parameter 1. In the example 5, the independent variable of the first preset key derivation function includes the parameter 2. In the examples 3 and 4, the independent variable of the first preset key derivation function includes the parameter 3. The shared key of the network element 1 includes the dependent variable of the first preset key derivation function.

Optionally, in some possible implementations of this embodiment, in the preset methods for calculating the shared key of the network element 1 in the foregoing five examples, the independent variable of the first preset key derivation function further includes some other related parameters, for example, at least one of a time used to indicate a validity period of the shared key of the network element 1, a current system time, a fresh parameter, a random number (nonce), a sequence number exclusive-OR anonymity key (SQN⊕AK, where SQN is an abbreviation of a sequence number, and AK is an abbreviation of anonymity key), a random number (RAND) parameter, a sequence number for calculating the shared key of the network element 1, an ID of the network element 1, an ID of the KMS 1, an ID of Kasme, a network ID, a link ID, an App ID, a service ID, or a session ID. This is not limited herein.

The ID of the network element 1 and an ID of the network element 2 each may include: at least one of an international mobile subscriber identity (IMSI), a globally unique temporary UE identity (GUTI), an IP multimedia private identity (IMPI), a temporary mobile subscriber identity (TMSI), a temporary IP multimedia private identity (TMPI), an IP multimedia public identity (IMPU), a service ID, a session ID, a network ID, a link ID, an App ID, or a gateway ID. When a network element is a server, an ID of the network element may further include a server ID.

Specifically, for example, K1=KDF(key, ID), K1=KDF (key, time), K1=KDF(key, ID, time), K1=KDF(key, SN), or K1=KDF(key, ID, SN). K1 is the shared key of the network element 1, K1=KDF( ) is the first preset key derivation function, time includes at least one of the time used to indicate the validity period of the shared key of the network element 1, or the current system time, and SN is the sequence number for calculating the shared key of the network element 1. In the examples 1 and 2, key includes the parameter 1, and in the example 3, key includes the parameter 2.

After the network element 1 and the KMS 1 separately obtain the shared key of the network element 1, when sending data to the network element 1, the KMS 1 may perform encryption and/or integrity protection on the data by using the shared key of the network element 1 and then send the data to the network element 1, so as to ensure security of the data.

S32: The network element 2 and the KMS 2 separately obtain a same shared key of the network element 2.

For details, refer to the method for separately obtaining, by the network element 1 and the KMS 1, the same shared key of the network element 1 in step S31. Details are not described herein again.

S33: The network element 1 sends a service request to a service server, where the service request is used to request the network element 1 to perform a first service with the network element 2.

In this embodiment, the service server is configured to perform service management between the first network element and the second network element.

In some possible implementations of the present invention, the network element 2 and the service server are a same network element. This is not limited herein.

During actual application, in step S33, the network element 1 may not send a service request to the service server, but another network element, for example, the network element 2, a server, a gateway, or another control network element initiates a service request to the service server. This is not limited herein.

S34: The service server authorizes the first service, and sends a response message to the network element 1 when the first service is authorized successfully.

In this embodiment, the response message includes at least one of an indicator, an identity of the first network element, an identifier of the second network element, or a service parameter of the first service, and the indicator is used to indicate that the first service is authorized successfully. For example, the indicator may include at least one of a service ID, an App ID, an SN, a session ID, a gateway ID, a server ID, a link ID, or a network ID.

In this embodiment, how the service server authorizes the first service is the prior art. Details are not described herein again.

S35: The network element 1 sends a key request of the first service to the KMS 1.

After receiving a notification that the first service sent by the service server is authorized successfully, the network element 1 sends the key request to the KMS 1, and the key request is used to initiate generation of a service key used for data communication between the network element 1 and the network element 2 in the first service. The network element 1 is a data transmit end, the network element 2 is a data receive end, and the key request includes the identity (ID) of the network element 1.

During actual application, the network element 1 may store the ID of the network element 2 and/or the service parameter of the first service. In this case, the key request may include at least one of the ID of the network element 1, the ID of the network element 2, or the service parameter of the first service. An objective of step S36 to step S38 is to send the ID of the network element 2 to the network element 1. Therefore, if the network element 1 already has the ID of the network element 2, step S36 and step S37 may be omitted.

Specifically, the identity of the network element 1 and the identity of the network element 2 each may include: at least one of an IMSI, a GUTI, an IMPI, a TMSI, a TMPI, an IMPU, a service ID, a session ID, a network ID, a link ID, an App ID, or a gateway ID. When a network element is a server, an ID of the network element may further include a server ID.

There may be various service parameters of the first service. For example, the service parameter of the first service may include at least one of a sequence number SN in the first service, a related time of the service key, a related ID in the service, a fresh parameter, or a random number (nonce). The related ID in the service may include at least one of the ID of the network element 1, the ID of the network element 2, the ID of the KMS 1, a service ID, a session ID, a network ID, a link ID, an App ID, a server ID, or a PLMN ID. The related time of the service key may include at least one of a start time, an end time, or a validity period of the first service. The ID of the network element 1 and the ID of the network element 2 may separately include at least one of an IMSI, an IMPI, a TMSI, an IMPU, an App ID, a network ID, a service ID, or a GUTI. This is not limited herein.

During actual application, the network element 1 may actively initiate the key request instead of sending the key request to the KMS 1 after receiving the notification that the first service sent by the service server is authorized successfully. That is, step S33 and step S34 may be omitted.

During actual application, in step S35, the network element 1 may not send the key request of the first service to the KMS 1, but another network element, for example, the network element 2, a server, a gateway or another control network element sends the key request to the KMS 1. This is not limited herein. The key request includes at least one of the ID of the network element 1, the ID of the network element 2, or the service parameter of the first service.

Alternatively, step S35 may be omitted. This is not limited herein.

S36: The network element 2 sends a key request of the first service to the KMS 2.

After receiving the notification that the first service sent by the service server is authorized successfully, the network element 2 sends the key request to the KMS 2, and the key request includes the ID of the network element 2. Specifically, the ID of the network element 2 may include: at least one of an IMSI, a GUTI, an IMPI, a TMSI, a TMPI, an IMPU, a service ID, a session ID, a network ID, a link ID, an App ID, or a gateway ID. When a network element is a server, an ID of the network element may further include a server ID.

S37: The KMS 2 sends a key request of the network element 2 to the KMS 1.

In this embodiment, step S36 and S37 are optional steps.

S38: The KMS 1 obtains a service key of the first service.

In this embodiment, there are a plurality of methods for obtaining, by the KMS 1, the service key of the first service, and several of the methods are described below by using examples.

Example 1: A random number is selected, and the service key includes the random number.

Example 2: A service parameter of the first service and at least one of a random number, Kasme of the network element 1, an integrity key of the network element 1, a cipher key of the network element 1, the root key of the network element 1, or the shared key of the network element 1 are obtained, and a dependent variable of a second preset key derivation function is calculated. The service key of the first service includes the dependent variable of the second preset key derivation function, and independent variables of the second preset key derivation function include the service parameter of the first service and at least one of the random number, Kasme of the network element 1, the integrity key of the network element 1, the cipher key of the network element 1, the root key of the network element 1, or the shared key of the network element 1. Kasme, the integrity key, and the cipher key of the network element 1 are obtained by the KMS 1 by performing AKA authentication with the network element 1. Alternatively, after the network element 1 and the MME perform AKA authentication, the MME obtains Kasme, the integrity key, and the cipher key, and sends Kasme, the integrity key, and the cipher key to the KMS 1. There are a plurality of methods for obtaining the root key of the network element 1. For example, the KMS 1 initiates a request to the HSS, and directly receives the root key of the network element 1 from the HSS. For a method for obtaining the shared key of the network element 1, refer to content in step S31. Details are not described herein again.

For the service parameter of the first service, refer to the example description of the service parameter of the first service in step S35. Details are not described herein again.

Example 3: The KMS 1 obtains a service parameter of the first service and at least one of a random number, Kasme of the network element 1, an integrity key of the network element 1, a cipher key of the network element 1, the root key of the network element 1, or the shared key of the network element 1, and calculates a first key according to the service parameter of the first service and at least one of the random number, Kasme of the network element 1, the integrity key of the network element 1, the cipher key of the network element 1, the root key of the network element 1, or the shared key of the network element 1; receives a second key sent by the KMS 2, where the second key is obtained according to the service parameter of the first service and at least one of the random number, Kasme of the network element 2, an integrity key of the network element 2, a cipher key of the network element 2, a root key of the network element 2, or a shared key of the network element 2; and calculates the service key according to the first key and the second key.

There are a plurality of methods for obtaining, by the KMS 1, the root key of the network element 1. For example, the KMS 1 initiates a request to the HSS, and directly receives the root key of the network element 1 from the HSS. Details are not described herein again. There are a plurality of methods for obtaining, by the KMS 2, the root key of the network element 2. For example, the KMS 2 initiates a request to the HSS, and directly receives the root key of the network element 2 from the HSS. Details are not described herein again.

There are a plurality of methods for obtaining, by the KMS 1, the first key according to the service parameter and at least one of the random number, Kasme of the network element 1, the integrity key of the network element 1, the cipher key of the network element 1, the root key of the network element 1, or the shared key of the network element 1. For example, the KMS 1 calculates a dependent variable of a third preset key derivation function, where the first key includes the dependent variable of the third preset key derivation function, and independent variables of the third preset key derivation function include the service parameter of the first service and at least one of the random number, Kasme of the network element 1, the integrity key of the network element 1, the cipher key of the network element 1, the root key of the network element 1, or the shared key of the network element 1.

There are a plurality of methods for obtaining, by the KMS 2, the second key according to the service parameter and at least one of the random number, Kasme of the network element 2, the integrity key of the network element 2, the cipher key of the network element 2, the root key of the network element 2, or the shared key of the network element 2. For example, the KMS 2 calculates a dependent variable of a fourth preset key derivation function, where the second key includes the dependent variable of the fourth preset key derivation function, and independent variables of the fourth preset key derivation function include the service parameter of the first service and at least one of the random number, Kasme of the network element 2, the integrity key of the network element 2, the cipher key of the network element 2, the root key of the network element 2, or the shared key of the network element 2.

There are a plurality of methods for calculating, by the KMS 1, the service key according to the first key and the second key. For example, the KMS 1 calculates a dependent variable of a fifth preset key derivation function, where the service key includes the dependent variable of the fifth preset key derivation function, and independent variables of the fifth preset key derivation function include the first key and the second key. Further, optionally, the independent variables of the fifth preset key derivation function further include the service parameter of the first service or another parameter. This is not limited herein.

Example 4: The service key of the first service is received to obtain the service key. Specifically, after generating the service key of the first service, a key generation center sends the service key to the KMS 1. For a method for generating, by the key generation center, the service key of the first service, refer to the method for generating, by the KMS 1, the service key in the foregoing example 1 to example 3. This is not limited herein.

S39: The KMS 1 sends the service key to the KMS 2.

In this embodiment, the KMS 1 obtains the service key of the first service, and then sends the service key to the KMS 2. During actual application, alternatively, the KMS 2 may obtain the service key of the first service, and then send the service key to the KMS 1. A method for obtaining, by the KMS 2, the service key of the first service may be the same as a method for obtaining, by the KMS 1, the key of the first service. Details are not described herein again.

S310: The KMS 2 performs encryption and/or integrity protection on the service key by using the shared key of the network element 2, to generate a security protection parameter of the network element 2.

The KMS 2 encrypts the service key by using the shared key of the network element 2, and specifically, encrypts the service key by using an encryption algorithm such as an AES encryption algorithm. Alternatively, the KMS 2 performs integrity protection on the service key by using the shared key of the network element 2, and specifically, performs integrity protection on the service key by using an integrity protection algorithm such as an HMAC algorithm. This is not limited herein. Alternatively, the KMS 2 performs encryption and integrity protection on the service key by using the shared key of the network element 2.

S311: The KMS 2 sends the security protection parameter of the network element 2 to the network element 2.

S312: The network element 2 obtains the service key according to the shared key of the network element 2 and the security protection parameter of the network element 2.

The security protection parameter of the network element 2 is obtained by performing encryption and/or integrity protection on the service key by using the shared key of the network element 2. Therefore, the network element 2 may restore the service key according to the security protection parameter of the network element 2 and the shared key of the network element 2.

S313: The KMS 1 performs encryption and/or integrity protection on the service key by using the shared key of the network element 1, to generate a security protection parameter of the network element 1.

For a specific explanation, refer to the explanation and the description of step S310. Details are not described herein again.

S314: The KMS 1 sends the security protection parameter of the network element 1 to the network element 1.

S315: The network element 1 obtains the service key according to the shared key of the network element 1 and the security protection parameter of the network element 1.

For a specific explanation, refer to the explanation and the description of step S312. Details are not described herein again. It should be noted that steps S313 to 315 and steps 39 to 312 are not necessarily performed in a particular order.

In the present invention, there are a plurality of methods for using the service key after the network element 1 and the network element 2 separately obtain the service key.

For example, the network element 1 protects first communication data by using the service key, generates second communication data, and sends the second communication data to the network element 2. Specifically, the network element 1 may directly perform encryption and/or integrity protection on the first communication data by using the service key to generate the second communication data. Alternatively, the network element 1 generates a service key K' according to a service key K by using a preset method, then performs encryption and/or integrity protection on the first communication data by using the service key K', to generate the second communication data, and sends the second communication data to the network element 2.

The network element 2 receives the second communication data, and restores the first communication data according to the service key. Specifically, if the network element 1 performs encryption and/or integrity protection on the first communication data according to the service key to generate the second communication data, the network element 2 directly restores the first communication data from the second communication data by using the service key. If the network element 1 performs encryption and/or integrity protection on the first communication data according to the service key K to generate the second communication data, the network element 2 generates the service key K' according to the service key K by using a preset method the same as that used by the network element 1, and then restores the first communication data from the second communication data by using the service key K'.

Certainly, alternatively, there may be another method for using, by the network element 1 and the network element 2, the service key. This is not limited herein.

In this embodiment, the KMS 1 sends the service key used for communication between the network element 1 and the network element 2 to the network element 1, so that when sending data to each other, the network element 1 and the network element 2 may use the service key to protect the data, thereby protecting the data against an eavesdropping attack in the sending process. In addition, the KMS 1 further performs encryption and/or integrity protection on the service key by using the shared key of the network element 1, then generates the first security protection parameter, and sends the first security protection parameter to the network element 1. Because the network element 1 generates the shared key of the network element 1 by using a method the same as that used by the KMS 1, the service key can be restored from the first security protection parameter, thereby ensuring security of the service key.

In the embodiment shown in FIG. 3, the network element 2 is user equipment, and the KMS 2 needs to first perform encryption and/or integrity protection on the service key by using a shared key 2 and then send the service key to the network element 2. During actual application, alternatively, the network element 2 may be a network element between which and the KMS 2 a secure channel is established. For example, the network element 2 is a server, a gateway, or another control network element. In this case, the KMS 2 directly sends the service key to the network element 2 by using the secure channel. Therefore, if a secure channel is established between the network element 2 and the KMS 2, step S32, step S310, and step S312 in the embodiment shown in FIG. 3 may be omitted. In addition, in step S311, the KMS 2 sends the service key to the network element 2.

In the embodiment shown in FIG. 3, a process after step S35 is triggered by using steps S33 and S34. Optionally, in a first possible implementation of the present invention, in step S33, the network element 1 may not send the service request to the service server, but the service server, the gateway, the MME, or the network element 2 sends a service message to the network element 1, where the service message is used to instruct the network element 1 and the network element 2 to perform the first service, and the service message includes at least one of the ID of the network element 1, the ID of the network element 2, or the service parameter of the first service.

In the embodiment shown in FIG. 3, the network element 1 and the network element 2 respectively correspond to different KMSs. Optionally, in a second possible implementation of the present invention, the network element 1 and the network element 2 may correspond to a same KMS. For example, both the network element 1 and the network element 2 are user equipments served by a same operator, and the two network elements both communicate with a same KMS in a process of applying for the service key. Therefore, in the embodiment shown in FIG. 3, the KMS 1 and the KMS 2 are a same key management system, and step S37 and step S39 may be omitted.

The embodiment of the communications system of the present invention and embodiments of a work process in the communications system are described above with reference to FIG. 2 and FIG. 3. A key distribution method in the present invention is described below.

Figure 4:
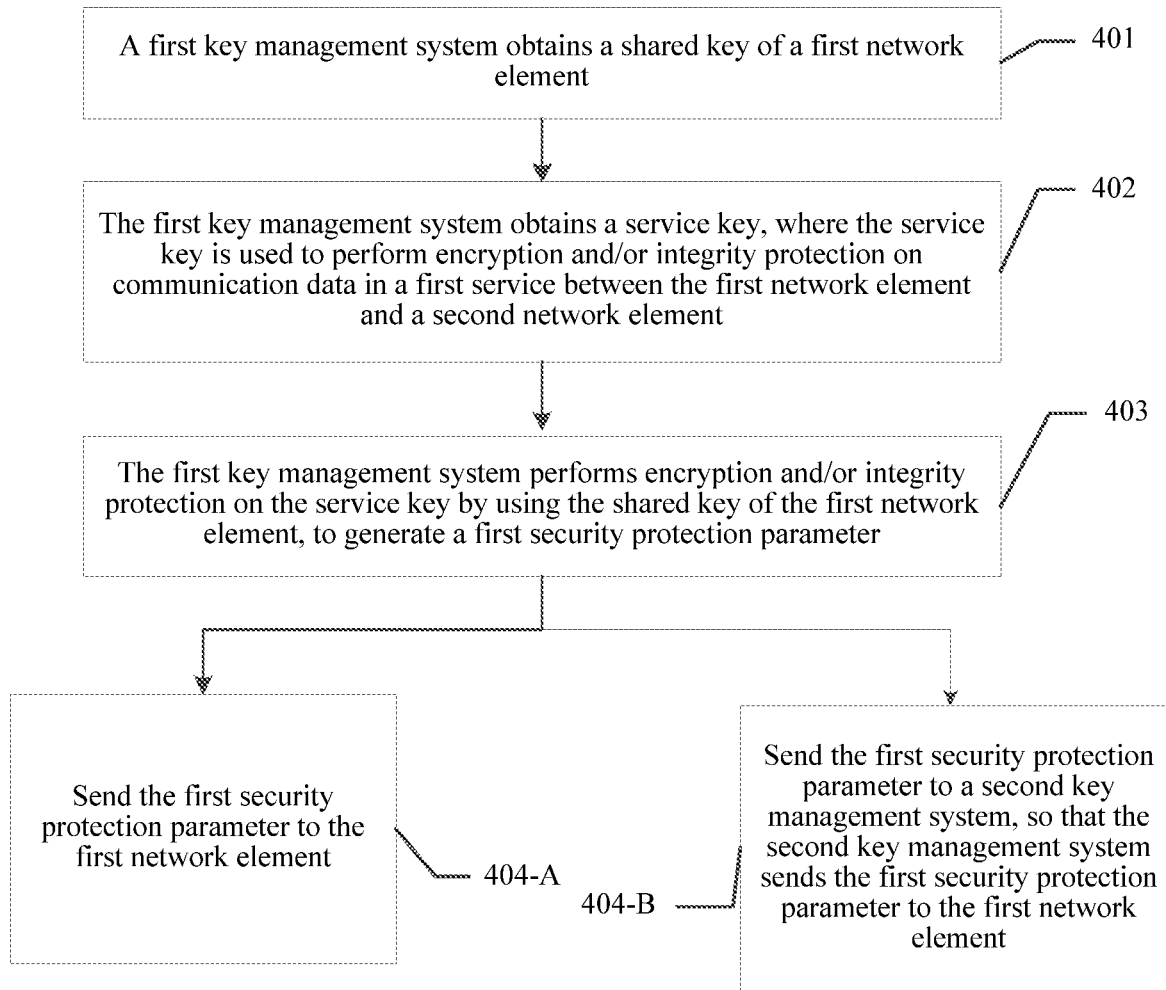
FIG. 4 is a schematic flowchart of an embodiment of a key distribution process according to the present invention.

Referring to FIG. 4, an embodiment of a key distribution method of the present invention includes the following steps.

401: A first key management system obtains a shared key of a first network element.

In this embodiment, the first key management system may be the KMS 1 in the embodiment shown in FIG. 2 and FIG. 3, and the first network element may be the network element 1 in the embodiment shown in FIG. 2 and FIG. 3.

402: The first key management system obtains a service key, where the service key is used to perform encryption and/or integrity protection on communication data in a first service between the first network element and a second network element.

403: The first key management system performs encryption and/or integrity protection on the service key by using the shared key of the first network element, to generate a first security protection parameter.

404: The first key management system performs one of the following step A or step B: step A: sending the first security protection parameter to the first network element; or step B: sending the first security protection parameter to a second key management system, so that the second key management system sends the first security protection parameter to the first network element.

In this embodiment, the first key management system sends a service key used for communication between network elements to the network elements, so that when sending data to each other, the network elements may use the service key to protect the data, thereby protecting the data against an eavesdropping attack in the sending process. In addition, the first key management system further performs encryption and/or integrity protection on the service key by using the shared key of the first network element, then generates the first security protection parameter, and sends the first security protection parameter to the first network element. Because the first network element generates the shared key of the first network element by using a method the same as that used by the first key management system, the service key can be restored from the first security protection parameter, thereby ensuring security of the service key.

For an explanation of this embodiment, refer to the description of the embodiment shown in FIG. 2 and FIG. 3 for understanding. Details are not described herein.

Figure 5:
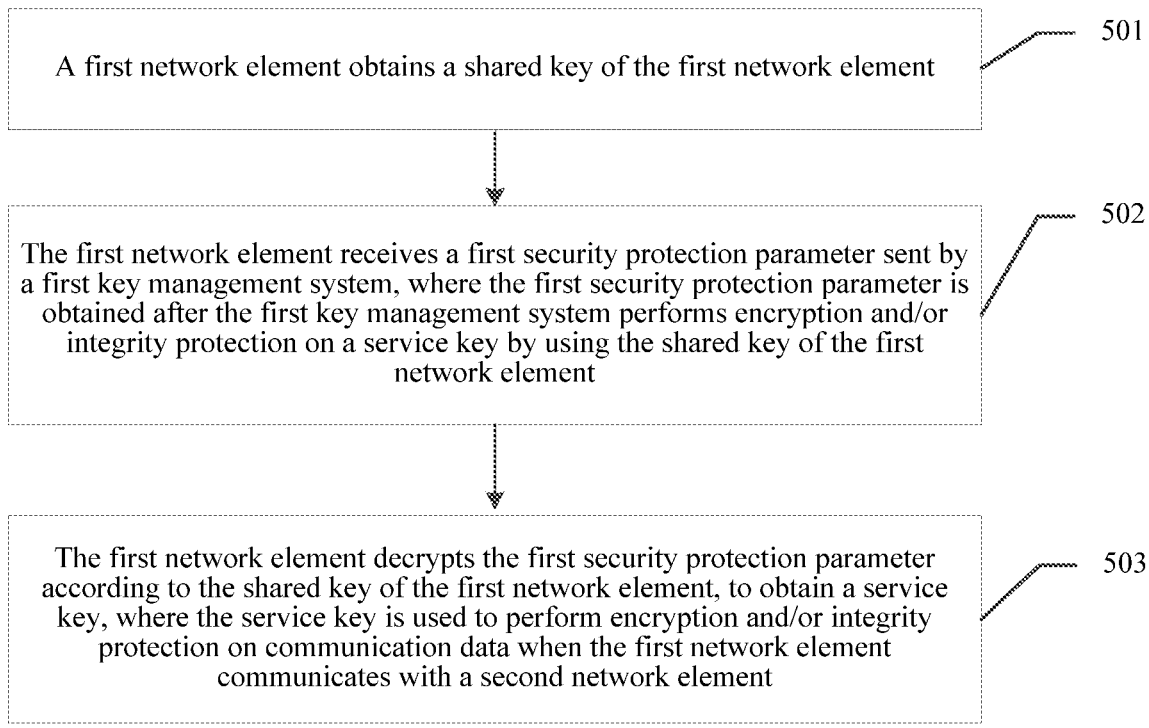
FIG. 5 is a schematic flowchart of an embodiment of a key receiving process according to the present invention.

Referring to FIG. 5, FIG. 5 is a schematic flowchart of an embodiment of a key receiving method according to the present invention. As shown in FIG. 5, the key receiving method in this embodiment includes the following steps.

501: A first network element obtains a shared key of the first network element, where the shared key of the first network element is generated according to a key parameter obtained after the first network element performs authentication or a root key of the first network element.

In this embodiment, the first network element may be the network element 1 in the embodiment shown in FIG. 2 and FIG. 3.

502: The first network element receives a first security protection parameter sent by the first key management system, where the first security protection parameter is obtained after the first key management system performs encryption and/or integrity protection on a service key by using the shared key of the first network element.

In this embodiment, the first key management system may be the KMS 1 in the embodiment shown in FIG. 2 and FIG. 3.

503: The first network element decrypts the first security protection parameter according to the shared key of the first network element, to obtain a service key, where the service key is used to perform encryption and/or integrity protection on communication data when the first network element communicates with a second network element.

For an explanation of this embodiment, refer to the description of the embodiment shown in FIG. 2 and FIG. 3 for understanding. Details are not described herein.

The key distribution method and the key receiving method in the embodiments of the present invention are described above, and a first key management system and a first network element in the embodiments of the present invention are described below.

Figure 6:
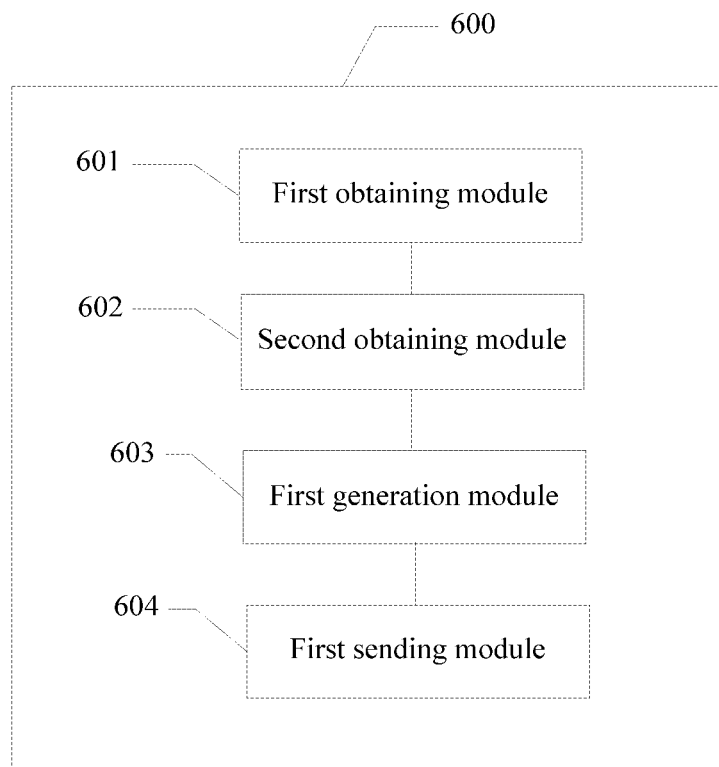
FIG. 6 is a schematic structural diagram of an embodiment of a first key management system according to the present invention.

Referring to FIG. 6, FIG. 6 is a schematic structural diagram of an embodiment of a first key management system according to the present invention. In this embodiment, the first key management system 600 includes: a first obtaining module 601, configured to obtain a shared key of a first network element, where the shared key of the first network element is generated according to a key parameter obtained after the first network element performs authentication or a root key of the first network element; a second obtaining module 602, configured to obtain a service key, where the service key is used to perform encryption and/or integrity protection on communication data in a first service between the first network element and a second network element; a first generation module 603, configured to: perform encryption and/or integrity protection on the service key by using the shared key of the first network element, to generate a first security protection parameter; and a first sending module 604, configured to perform one of the following step A or step B: step A: sending the first security protection parameter to the first network element; or step B: sending the first security protection parameter to a second key management system, so that the second key management system sends the first security protection parameter to the first network element.

In this embodiment, the first key management system sends a service key used for communication between network elements to the network elements, so that when sending data to each other, the network elements may use the service key to protect the data, thereby protecting the data against an eavesdropping attack in the sending process. In addition, the first key management system further performs encryption and/or integrity protection on the service key by using the shared key of the first network element, then generates the first security protection parameter, and sends the first security protection parameter to the first network element. Because the first network element generates the shared key of the first network element by using a method the same as that used by the first key management system, the service key can be restored from the first security protection parameter, thereby ensuring security of the service key.

In some possible implementations of the present invention, the first obtaining module 601 is specifically configured to: obtain a first parameter by performing AKA authentication with the first network element, where the first parameter includes at least one of Kasme, an integrity key, or a cipher key; and calculate a dependent variable of a first preset key derivation function, where the shared key of the first network element includes the dependent variable of the first preset key derivation function, and an independent variable of the first preset key derivation function includes the first parameter.

In some possible implementations of the present invention, the first obtaining module 601 is specifically configured to: receive the shared key of the first network element sent by a mobility management entity MME, where the shared key of the first network element is calculated by the MME by using a third parameter; or receive a third parameter sent by an MME, where the third parameter is obtained by the MME by performing AKA authentication with the first network element; and calculate a dependent variable of a first preset key derivation function, where the shared key of the first network element includes the dependent variable of the first preset key derivation function, and an independent variable of the first preset key derivation function includes the third parameter, where the third parameter is obtained by the MME by performing AKA authentication with the first network element, and the third parameter includes at least one of Kasme, an integrity key, a cipher key, a non-access stratum integrity key, a non-access stratum cipher key, or a base station key.

In some possible implementations of the present invention, when the first sending module 604 is configured to perform the step A, the second obtaining module 602 is specifically configured to: select a random number, where the service key includes the random number; or obtain a service parameter of the first service and at least one of a random number, Kasme of the first network element, an integrity key of the first network element, a cipher key of the first network element, the root key of the first network element, or the shared key of the first network element, and calculate a dependent variable of a second preset key derivation function, where the service key includes the dependent variable of the second preset key derivation function, and independent variables of the second preset key derivation function include a parameter of the first service, and include at least one of the random number, Kasme of the first network element, the root key of the first network element, or the shared key of the first network element.

In some possible implementations of the present invention, when the first sending module 604 is configured to perform the step B, the second obtaining module 602 is specifically configured to: select a random number, where the service key includes the random number; obtain a service parameter of the first service and at least one of a random number, Kasme of the first network element, an integrity key of the first network element, a cipher key of the first network element, the root key of the first network element, or the shared key of the first network element, and calculate a first key according to the service parameter of the first service and at least one of the random number, Kasme of the first network element, the root key of the first network element, or the shared key of the first network element; receive a second key sent by the second key management system, where the second key is obtained through calculation according to the service parameter of the first service and at least one of the random number, Kasme of the second network element, a root key of the second network element, or a shared key of the second network element; and calculate the service key according to the first key and the second key; or receive the service key sent by the second key management system, where the service key is obtained through calculation by the second key management system according to a service parameter of the first service and at least one of a random number, Kasme of the second network element, an integrity key of the second network element, a cipher key of the second network element, a root key of the second network element, or a shared key of the second network element.

Figure 7:
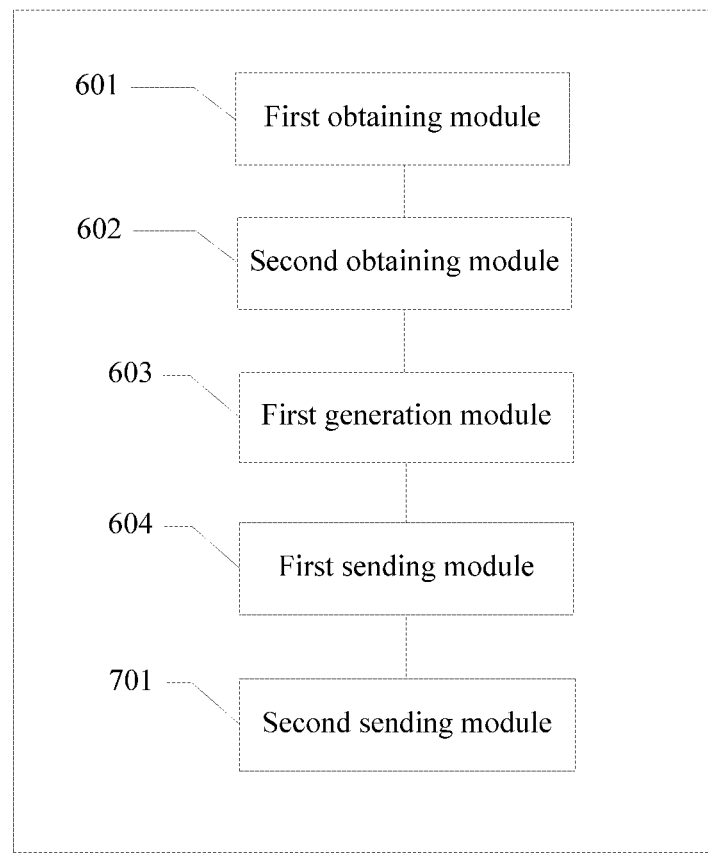
FIG. 7 is a schematic structural diagram of another embodiment of a first key management system according to the present invention.

As shown in FIG. 7, in some possible implementations of the present invention, the first key management system further includes: a first receiving module, configured to: before the second obtaining module obtains the service key, receive a key request from the first network element, the second network element, a gateway, or a server, where the key request is used to initiate generation of the service key, and the key request includes at least one of an identity of the first network element, an identity of the second network element, or a service parameter of the first service.

As shown in FIG. 7, in some possible implementations of the present invention, when the first sending module 604 is configured to perform the step A, a secure channel is established between the second network element and the first key management system; and the first key management system further includes a second sending module 701, configured to send the service key to the second network element by using the secure channel.

Figure 8:
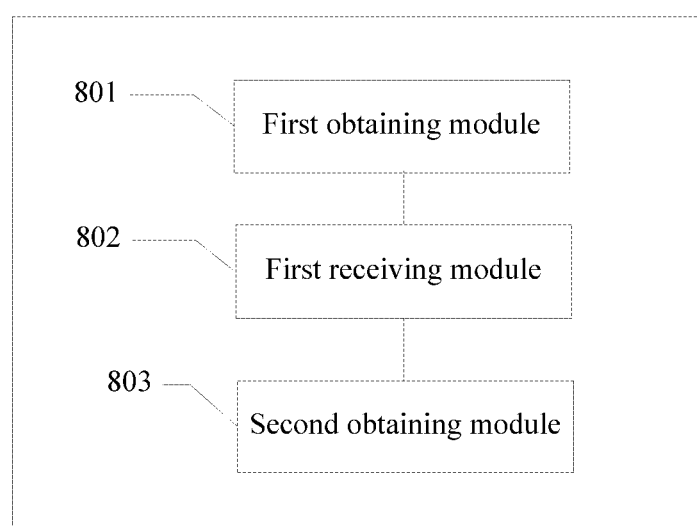
FIG. 8 is a schematic structural diagram of an embodiment of a first network element according to the present invention.

Referring to FIG. 8, FIG. 8 is a schematic structural diagram of an embodiment of a first network element according to the present invention. In this embodiment, the first network element 800 includes: a first obtaining module 801, configured to obtain a shared key of the first network element, where the shared key of the first network element is generated according to a key parameter obtained after the first network element performs authentication or a root key of the first network element; a first receiving module 802, configured to receive a first security protection parameter sent by the first key management system, where the first security protection parameter is obtained after the first key management system performs encryption and/or integrity protection on a service key by using the shared key of the first network element; and a second obtaining module 803, configured to decrypt the first security protection parameter according to the shared key of the first network element, to obtain a service key, where the service key is used to perform encryption and/or integrity protection on communication data when the first network element communicates with a second network element.

In some possible implementations of the present invention, the first obtaining module 801 is specifically configured to perform the following step C and/or step D: step C: obtaining the root key of the first network element, and calculating a dependent variable of a first preset key derivation function, where the shared key of the first network element includes the dependent variable of the first preset key derivation function, and an independent variable of the first preset key derivation function includes the root key of the first network element; and step D: obtaining a first parameter by performing AKA authentication, where the first parameter includes at least one of Kasme, an integrity key, or a cipher key; and calculating the dependent variable of the first preset key derivation function, where the shared key of the first network element includes the dependent variable of the first preset key derivation function, and the independent variable of the first preset key derivation function includes the first parameter.

Figure 9:
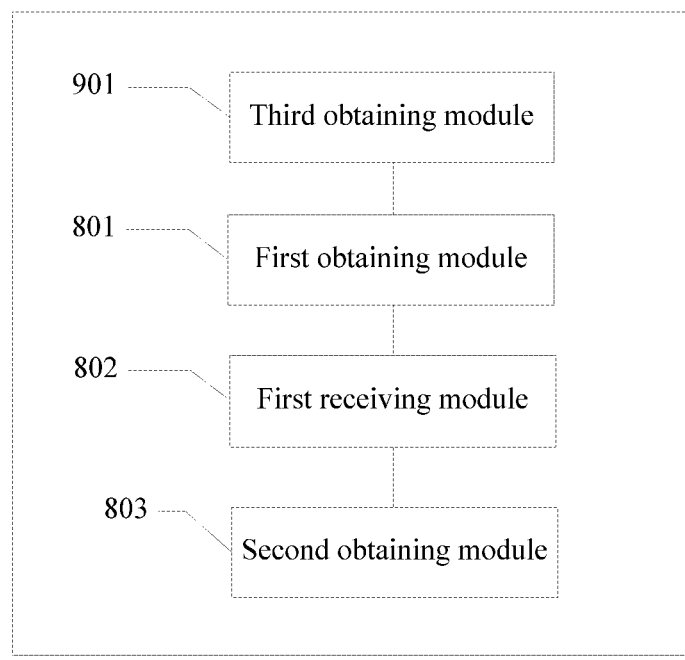
FIG. 9 is a schematic structural diagram of another embodiment of a first network element according to the present invention.

As shown in FIG. 9, in some possible implementations of the present invention, the first network element further includes: a third obtaining module 901, configured to obtain an identity of the second network element and/or a service parameter of the first service, where the independent variable of the first preset key derivation function further includes the identity of the second network element and/or the service parameter of the first service.

Figure 10:
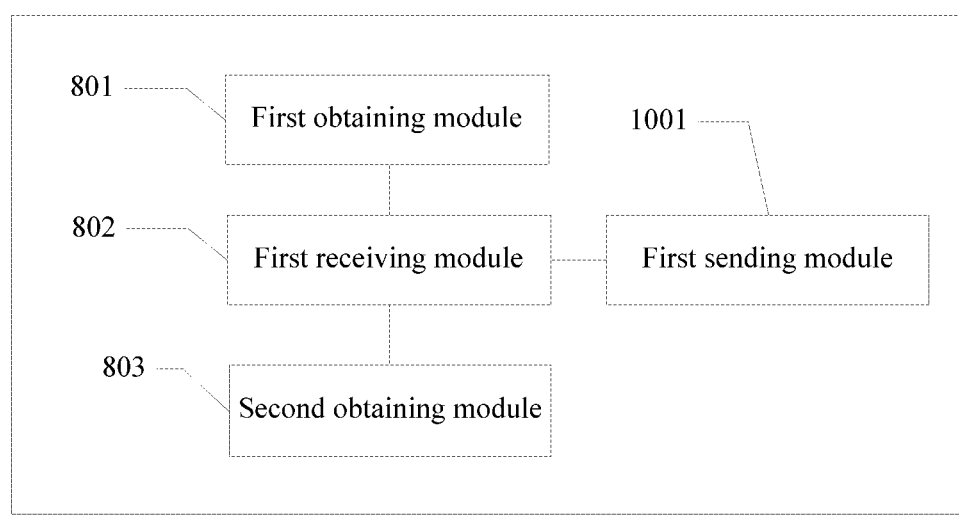
FIG. 10 is a schematic structural diagram of another embodiment of a first network element according to the present invention.

As shown in FIG. 10, in some possible implementations of the present invention, the first network element further includes a first sending module 1001, configured to: before the first receiving module 802 receives the first security protection parameter sent by the first key management system, send a key request to the first key management system, where the key request is used to initiate generation of the service key, and the key request includes at least one of an identity of the first network element, an identity of the second network element, or a service parameter of the first service.

Figure 11:
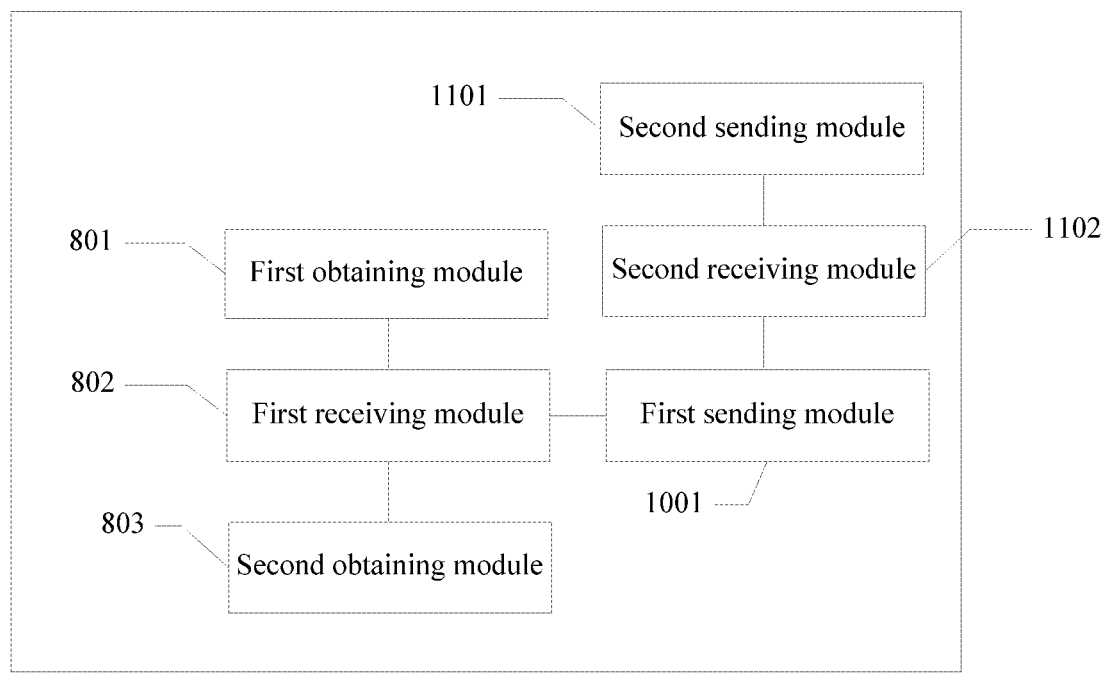
FIG. 11 is a schematic structural diagram of another embodiment of a first network element according to the present invention.

As shown in FIG. 11, in some possible implementations of the present invention, the first network element further includes: a second sending module 1101, configured to: before the first sending module sends the key request to the first key management system, send a service request to a service server, where the service server is configured to perform service management between the first network element and the second network element; and a second receiving module 1102, configured to receive a response message sent by the service server, where the response message includes at least one of an indicator, an identifier of the first network element, an identifier of the second network element, or the service parameter of the first service, and the indicator is used to indicate that the first service is authorized successfully.

Figure 12:
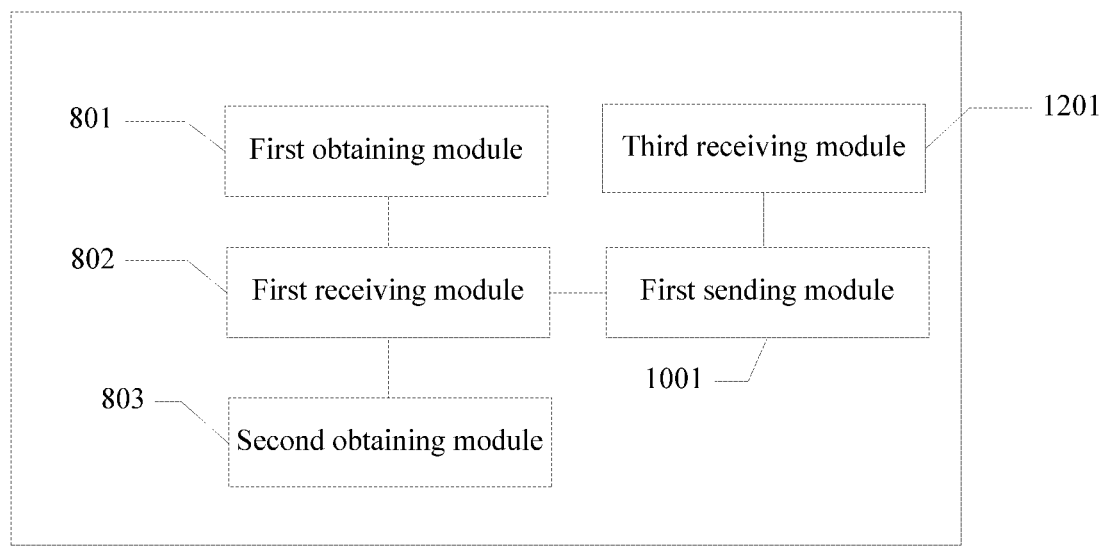
FIG. 12 is a schematic structural diagram of another embodiment of a first network element according to the present invention.

As shown in FIG. 12, in some possible implementations of the present invention, the first network element further includes: a third receiving module 1201, configured to: before the first sending module 1001 sends the key request to the first key management system, receive a service message sent by a service server, a gateway, an MME, or the second network element, where the service message includes at least one of the identity of the first network element, the identity of the second network element, or the service parameter of the first service.

The first key management system and the first network element in the embodiments of the present invention are described above from the perspective of a unitized functional entity, and a first key management system and a first network element in the embodiments of the present invention are described below from the perspective of hardware processing.

Figure 13:
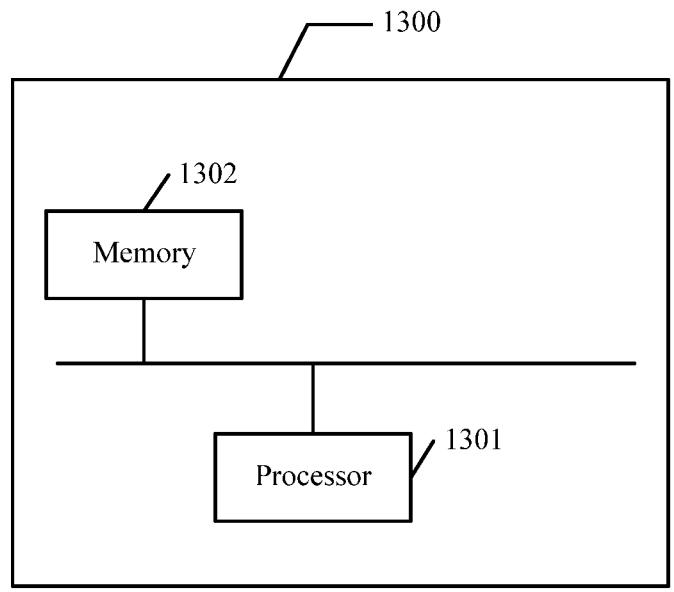
FIG. 13 is a schematic structural diagram of an embodiment of a first key management system according to the present invention.

Referring to FIG. 13, FIG. 13 is a schematic structural diagram of an embodiment of a first key management system according to the present invention. In this embodiment, the first key management system 1300 includes: a processor 1301, and a memory 1302 coupled to the processor 1301, where the processor 1301 reads a computer program stored in the memory 1302 to perform the following operations: obtaining a shared key of a first network element, where the shared key of the first network element is generated according to a key parameter obtained after the first network element performs authentication or a root key of the first network element; obtaining a service key, where the service key is used to perform encryption and/or integrity protection on communication data in a first service between the first network element and a second network element; performing encryption and/or integrity protection on the service key by using the shared key of the first network element, to generate a first security protection parameter; and performing one of the following step A or step B: step A: sending the first security protection parameter to the first network element; or step B: sending the first security protection parameter to a second key management system, so that the second key management system sends the first security protection parameter to the first network element.

In some possible implementations of the present invention, the obtaining a shared key of a first network element includes: obtaining a first parameter by performing AKA authentication with the first network element, where the first parameter includes at least one of Kasme, an integrity key, or a cipher key; and calculating a dependent variable of a first preset key derivation function, where the shared key of the first network element includes the dependent variable of the first preset key derivation function, and an independent variable of the first preset key derivation function includes the first parameter.

In some possible implementations of the present invention, the obtaining a shared key of a first network element includes: receiving, by the first key management system, the shared key of the first network element sent by a mobility management entity MME, where the shared key of the first network element is calculated by the MME by using a third parameter; or receiving a third parameter sent by an MME, where the third parameter is obtained by the MME by performing AKA authentication with the first network element; and calculating a dependent variable of a first preset key derivation function, where the shared key of the first network element includes the dependent variable of the first preset key derivation function, and an independent variable of the first preset key derivation function includes the third parameter, where the third parameter is obtained by the MME by performing AKA authentication with the first network element, and the third parameter includes at least one of Kasme, an integrity key, a cipher key, a non-access stratum integrity key, a non-access stratum cipher key, or a base station key.

In some possible implementations of the present invention, when the processor 1301 is configured to perform the step A, the obtaining a service key includes: selecting a random number, where the service key includes the random number; or obtaining a service parameter of the first service and at least one of a random number, Kasme of the first network element, an integrity key of the first network element, a cipher key of the first network element, the root key of the first network element, or the shared key of the first network element, and calculating a dependent variable of a second preset key derivation function, where the service key includes the dependent variable of the second preset key derivation function, and independent variables of the second preset key derivation function include a parameter of the first service, and include at least one of the random number, Kasme of the first network element, the root key of the first network element, or the shared key of the first network element.

In some possible implementations of the present invention, when the processor 1301 is configured to perform the step B, the obtaining a service key includes: selecting a random number, where the service key includes the random number; obtaining a service parameter of the first service and at least one of a random number, Kasme of the first network element, an integrity key of the first network element, a cipher key of the first network element, the root key of the first network element, or the shared key of the first network element, and calculating a first key according to the service parameter of the first service and at least one of the random number, Kasme of the first network element, the root key of the first network element, or the shared key of the first network element; receiving a second key sent by the second key management system, where the second key is obtained through calculation according to the service parameter of the first service and at least one of the random number, Kasme of the second network element, a root key of the second network element, or a shared key of the second network element; and calculating the service key according to the first key and the second key; or receiving the service key sent by the second key management system, where the service key is obtained through calculation by the second key management system according to a service parameter of the first service and at least one of a random number, Kasme of the second network element, an integrity key of the second network element, a cipher key of the second network element, a root key of the second network element, or a shared key of the second network element.

In some possible implementations of the present invention, the processor 1301 is further configured to: before the service key is obtained, perform the following step: receiving a key request from the first network element, the second network element, a gateway, or a server, where the key request is used to initiate generation of the service key, and the key request includes at least one of an identity of the first network element, an identity of the second network element, or a service parameter of the first service.

In some possible implementations of the present invention, when the processor 1301 is configured to perform the step A, a secure channel is established between the second network element and the first key management system; and the processor 1301 is further configured to perform the following step: sending the service key to the second network element by using the secure channel.

Figure 14:
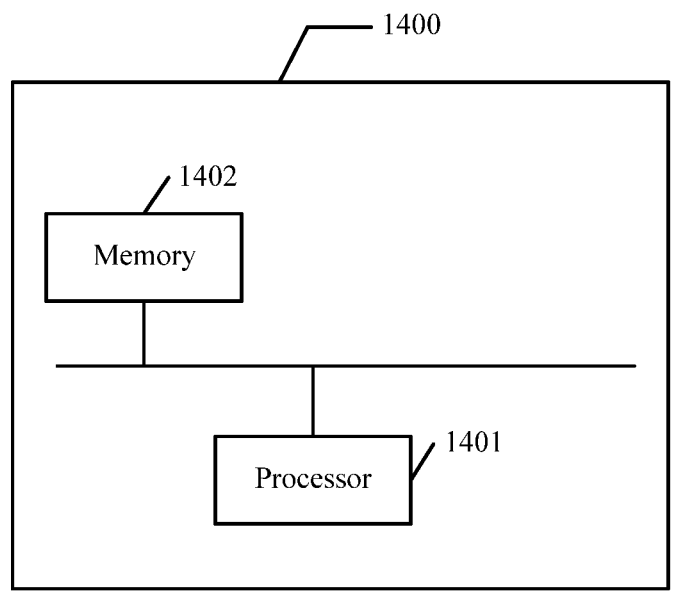
FIG. 14 is a schematic structural diagram of an embodiment of a first network element according to the present invention.

Referring to FIG. 14, FIG. 14 is a schematic structural diagram of an embodiment of a first key management system according to the present invention. In this embodiment, the first network element 1400 includes: a processor 1401, and a memory 1402 coupled to the processor 1401, where the processor 1401 reads a computer program stored in the memory 1402 to perform the following operations: obtaining a shared key of a first network element, where the shared key of the first network element is generated according to a key parameter obtained after the first network element performs authentication or a root key of the first network element; receiving a first security protection parameter sent by the first key management system, where the first security protection parameter is obtained after the first key management system performs encryption and/or integrity protection on a service key by using the shared key of the first network element; and decrypting the first security protection parameter according to the shared key of the first network element, to obtain a service key, where the service key is used to perform encryption and/or integrity protection on communication data when the first network element communicates with a second network element.

In some possible implementations of the present invention, the obtaining a shared key of a first network element includes the following step C and/or step D: step C: obtaining, by the first network element, the root key of the first network element, and calculating a dependent variable of a first preset key derivation function, where the shared key of the first network element includes the dependent variable of the first preset key derivation function, and an independent variable of the first preset key derivation function includes the root key of the first network element; and step D: obtaining, by the first network element, a first parameter by performing AKA authentication, where the first parameter includes at least one of Kasme, an integrity key, or a cipher key; and calculating, by the first network element, the dependent variable of the first preset key derivation function, where the shared key of the first network element includes the dependent variable of the first preset key derivation function, and the independent variable of the first preset key derivation function includes the first parameter.

In some possible implementations of the present invention, the processor 1401 is further configured to perform the following step: obtaining an identity of the second network element and/or a service parameter of the first service, where the independent variable of the first preset key derivation function further includes the identity of the second network element and/or the service parameter of the first service.

In some possible implementations of the present invention, the processor 1401 is further configured to: before the first security protection parameter sent by the first key management system is received, send a key request to the first key management system, where the key request is used to initiate generation of the service key, and the key request includes at least one of an identity of the first network element, an identity of the second network element, or a service parameter of the first service.

In some possible implementations of the present invention, the processor 1401 is further configured to: before the key request is sent to the first key management system, send a service request to a service server, where the service server is configured to perform service management between the first network element and the second network element; and receive a response message sent by the service server, where the response message includes at least one of an indicator, an identifier of the first network element, an identifier of the second network element, or the service parameter of the first service, and the indicator is used to indicate that the first service is authorized successfully.

In some possible implementations of the present invention, the processor 1401 is further configured to: before the key request is sent to the first key management system, receive a service message sent by a service server, a gateway, an MME, or the second network element, where the service message includes at least one of the identity of the first network element, the identity of the second network element, or the service parameter of the first service.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

The invention claimed is:

1. A method, comprising:
obtaining, by a first key management system, a shared key of a first network element, wherein the shared key of the first network element is generated according to a key parameter obtained after the first network element is authenticated;
obtaining, by the first key management system based on the shared key, a service key, wherein encryption or integrity protection is performed on communication data using the service key in a first service between the first network element and a second network element; and
sending, by the first key management system, the service key to the second network element.

2. The method according to claim 1, wherein obtaining, by the first key management system, the shared key of the first network element comprises:
obtaining, by the first key management system, a first parameter, wherein the first parameter is obtained by performing Authentication and Key Agreement (AKA) authentication with the first network element, wherein the first parameter comprises an integrity key, and a cipher key; and
calculating, by the first key management system, a dependent variable of a first preset key derivation function, wherein the shared key of the first network element comprises the dependent variable of the first preset key derivation function, and wherein an independent variable of the first preset key derivation function comprises the first parameter.

3. The method according to claim 1, wherein obtaining, by the first key management system, the shared key of the first network element comprises:
receiving, by the first key management system, the shared key of the first network element from a home subscriber server, wherein the shared key of the first network element is calculated based on an integrity key (IK), and a cipher key (CK), and the CK and IK are obtained by performing Authentication and Key Agreement (AKA) authentication with the first network element.

4. The method according to claim 1, wherein obtaining, by the first key management system, the service key comprises:
calculating, by the first key management system, a dependent variable of a second preset key derivation function, wherein the service key comprises the dependent variable of the second preset key derivation function, and wherein an independent variable of the second preset key derivation function comprises a service parameter of the first service and the shared key; wherein the service parameter of the first service comprises a random number.

5. The method according to claim 4, wherein the service parameter of the first service further comprises an identity of the first network element.

6. The method according to claim 5, further comprising: receiving, by the first key management system from the first network element, a request comprising the random number and the identity of the first network element.

7. A method, comprising:
generating, by a home subscriber server, a shared key of a first network element based on an integrity key (IK), and a cipher key (CK), and the CK and IK are obtained by performing Authentication and Key Agreement (AKA) authentication with the first network element;
sending, by the home subscriber server, the shared key to a first key management system;
obtaining, by the first key management system based on the shared key, a service key, wherein encryption or integrity protection is performed on communication data using the service key in a first service between the first network element and a second network element; and
sending, by the first key management system, the service key to the second network element.

8. The method according to claim 7, wherein obtaining, by the first key management system, the service key comprises:
calculating, by the first key management system, a dependent variable of a second preset key derivation function, wherein the service key comprises the dependent variable of the second preset key derivation function, and wherein an independent variable of the second preset key derivation function comprises a service parameter of the first service and the shared key; wherein the service parameter of the first service comprises a random number.

9. The method according to claim 8, wherein the service parameter of the first service further comprises an identity of the first network element.

10. The method according to claim 9, further comprising: receiving, by the first key management system from the first network element, a request comprising the random number and the identity of the first network element.

11. An apparatus, comprising:
at least one processor; and
a non-transitory memory coupled to the at least one processor and having instructions stored thereon which, when executed by the at least one processor, cause the apparatus to:
obtain a shared key of a first network element, wherein the shared key of the first network element is generated according to a key parameter obtained after the first network element is authenticated;
obtain a service key based on the shared key, wherein encryption or integrity protection is performed on communication data using the service key in a first service between the first network element and a second network element; and
send the service key to the second network element.

12. The apparatus according to claim 11, wherein the instructions, when executed by the at least one processor, further cause the apparatus to:
obtain a first parameter, wherein the first parameter is obtained by performing Authentication and Key Agreement (AKA) authentication with the first network element, wherein the first parameter comprises an integrity key, and a cipher key; and
calculate a dependent variable of a first preset key derivation function, wherein the shared key of the first network element comprises the dependent variable of the first preset key derivation function, and wherein an independent variable of the first preset key derivation function comprises the first parameter.

13. The apparatus according to claim 11, wherein the instructions, when executed by the at least one processor, further cause the apparatus to:
receive the shared key of the first network element from a home subscriber server, wherein the shared key of the first network element is calculated based on an integrity key (IK), and a cipher key (CK), and the CK and IK are obtained by performing Authentication and Key Agreement (AKA) authentication with the first network element.

14. The apparatus according to claim 11, wherein the instructions, when executed by the at least one processor, further cause the apparatus to:
calculate a dependent variable of a second preset key derivation function, wherein the service key comprises the dependent variable of the second preset key derivation function, and wherein an independent variable of the second preset key derivation function comprises a service parameter of the first service and the shared key; wherein the service parameter of the first service comprises a random number.

15. The apparatus according to claim 14, wherein the service parameter of the first service further comprises an identity of the first network element.

16. The apparatus according to claim 15, wherein the instructions, when executed by the at least one processor, further cause the apparatus to:
receive, from the first network element, a request comprising the random number and the identity of the first network element.

17. A system, comprising a home subscriber server and a first key management system, wherein:
the home subscriber server performs steps to:
generate a shared key of a first network element based on an integrity key (IK), and a cipher key (CK), and the CK and IK are obtained by performing Authentication and Key Agreement (AKA) authentication with the first network element; and
send the shared key to the first key management system; and
the first key management system performs steps to:
obtain a service key based on the shared key, wherein encryption or integrity protection is performed on communication data using the service key in a first service between the first network element and a second network element; and
send the service key to the second network element.

18. The system according to claim 17, wherein the first key management system, further performs steps to calculate a dependent variable of a second preset key derivation function, wherein the service key comprises the dependent variable of the second preset key derivation function, wherein an independent variable of the second preset key derivation function comprises a service parameter of the first service and the shared key, and wherein the service parameter of the first service comprises a random number.

19. The system according to claim 18, wherein the service parameter of the first service further comprises an identity of the first network element.

20. The system according to claim 19, wherein the first key management system, further performs steps to receive, from the first network element, a request comprising the random number and the identity of the first network element.

* * * * *

UNITED STATES PATENT AND TRADEMARK OFFICE
CERTIFICATE OF CORRECTION

PATENT NO. : 11,700,245 B2  
APPLICATION NO. : 17/700064  
DATED : July 11, 2023  
INVENTOR(S) : Gan et al.

Page 1 of 1

It is certified that error appears in the above-identified patent and that said Letters Patent is hereby corrected as shown below:

On the Title Page

Item (51), in Column 1, above "Int. Cl.", insert:
-- (30) Foreign Application Priority Data
Nov. 13, 2015 (CN) ............... 201510777207.4 --.

Signed and Sealed this  
Twenty-sixth Day of September, 2023

Katherine Kelly Vidal  
*Director of the United States Patent and Trademark Office*